United States Patent [19]

Kuroda et al.

[11] Patent Number: 4,603,347
[45] Date of Patent: Jul. 29, 1986

[54] INTRAFRAME CODING AND DECODING EQUIPMENT FOR VIDEO SIGNALS OF DIFFERENT QUALITY

[75] Inventors: Hideo Kuroda; Naoki Mukawa, both of Kanagawa, Japan

[73] Assignee: Nippon Telegraph & Telephone Public Corporation, Tokyo, Japan

[21] Appl. No.: 489,311

[22] Filed: Apr. 28, 1983

[30] Foreign Application Priority Data

May 6, 1982 [JP] Japan ................................. 57-74513
Sep. 8, 1982 [JP] Japan ................................. 57-155149
Feb. 4, 1983 [JP] Japan ................................. 58-16190

[51] Int. Cl.[4] .......................................... H04N 11/04
[52] U.S. Cl. ..................................... 358/13; 358/141; 375/111
[58] Field of Search .................... 358/13, 17, 150, 141, 358/326; 375/109, 111, 121

[56] References Cited

U.S. PATENT DOCUMENTS 3,633,164  1/1972  Hynes ..................... 375/121
3,878,335  4/1975  Balaban ................... 358/150

OTHER PUBLICATIONS

Review of the Electrical Communication Laboratories, vol. 27, Nos. 11-12, Nov.-Dec., 1979, pp. 1095-1112. Asynchronous Intra-Frame Coding with One-Dimensional Prediction, J. Yamagata, H. Takashima, N. Bando and T. Doi, Eng. Bureau, NTT-Tokyo, pp. 62.1.162.1.5.

Primary Examiner—John W. Shepperd
Attorney, Agent, or Firm—Roberts, Spiecens & Cohen

[57] ABSTRACT

Intraframe coding and decoding equipment are used in a communication network for digital video signals. Video signal sources which have various frequency deviations are transmitted by the communication network. Each of the intraframe coding and decoding equipment items has a locked sampling coding algorithm which is suitable for an input video signal with high frequency precision and a nonlocked sampling coding algorithm which is suitable for an input video signal with low frequency precision. It is determined whether or not the frequency precision (i.e., the frequency deviation of the sync signal) falls within a predetermined range. One of the coding algorithms is selected in accordance with a detection result. The coding algorithm can be selected in accordance with a decoding algorithm of a receiving-side equipment. Switching of the coding algorithms is performed simultaneously with switching of the clock signals of the locked and unlocked sampling clocks.

11 Claims, 16 Drawing Figures

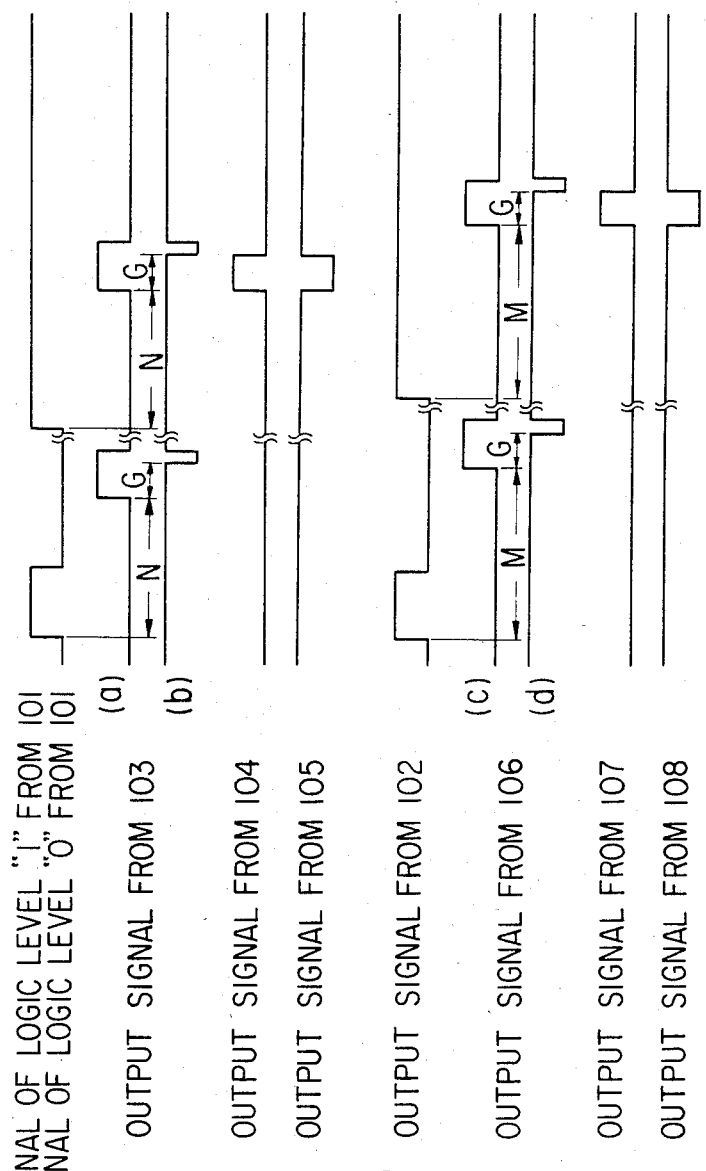

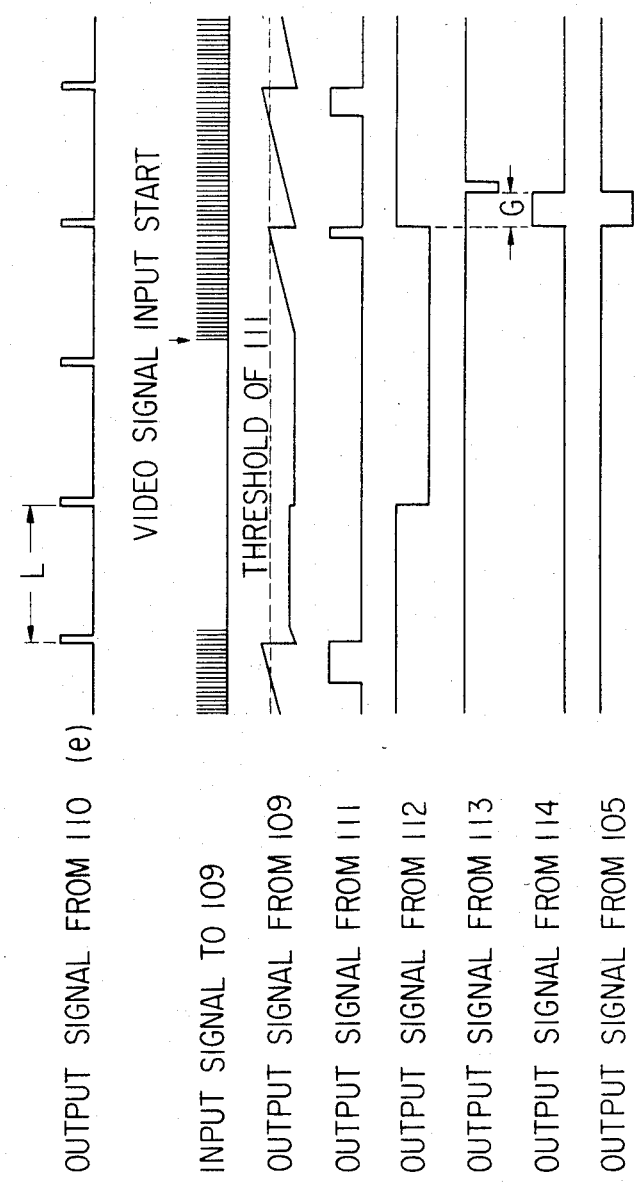

INTRAFRAME CODING AND DECODING EQUIPMENT FOR VIDEO SIGNALS OF DIFFERENT QUALITY

BACKGROUND OF THE INVENTION

I. Field of the Invention

The present invention relates to intraframe coding and decoding equipment suitable for video signals of different qualities and for a video signal communication network which includes various types of coding devices.

II. Description of the Prior Art

Conventionally, communication networks for video signals have been mainly configured as private networks. An integrated service digital network including digital video transmission service has been recently developed. In order to achieve an economic video communication system, a system is proposed which uses an intraframe coding equipment for short and intermediate distance transmissions and uses an interframe coding equipment for long distance transmission.

From the economic viewpoint described above, the long distance transmission must be performed by a three-transmission link of intraframe, interframe and intraframe coding equipment. Furthermore, in order to prevent an increase in noise and degradation of phase characteristics, it is preferred to form series-connected digital links wherein digital signals are not converted to analog signals but are transmitted as they are in the coding and decoding process.

In the interframe coding, locked sampling (i.e., phase synchronous sampling with that of the sync signal) must be introduced to improve coding efficiency. Therefore, locked sampling must be introduced in a link of the intraframe coding equipment which is digitally connected in series with the interframe coding equipment.

On the other hand, a frequency deviation of a synchronizing (sync) signal in the video signal varies from a deviation which falls within a range of ±30 ppm of a signal represented by a broadcast television signal to a deviation which falls within a range of ±1,000 ppm of an output from a commercially available, portable video tape recorder (VTR). It is possible to perform locked sampling of the former signal. However, since the latter has a great frequency deviation, it is very difficult to generate a sampling clock synchronous with a sync signal of the VTR output by a phase locked oscillator which is generally used as a sync clock generator.

A time-base corrector and a frame synchronizer are used to decrease the frequency deviation. When such units are connected to the portable VTR, the frequency deviation can be absorbed. However, these units are very expensive and unavailable to the portable VTR, so that nonlocked sampling cannot but be introduced for a video signal (e.g., the output from the portable VTR) having a great frequency deviation.

Meanwhile, portable VTRs have recently become prevalent. Under these circumstances, short and intermediate distance transmission service must be performed by utilizing the intraframe coding equipment of nonlocked sampling, although the output signal from the portable VTR cannot be transmitted over a long distance by using the interframe coding equipment.

In the public communication network, video signals of different quality, such as broadcast television signals with a small frequency deviation and VTR output with a great frequency deviation, have to be processed and transmitted. In order to transmit video signals of different quality in a digital form, the coding system must have both locked and nonlocked sampling coding functions, and must select one of these functions in accordance with the frequency deviation of video signal.

However, since the video signal network has been conventionally constituted by a private network, coding equipment has needed to have only one of the above-mentioned functions. As a result, the constitution of coding equipment for locked sampling is entirely different from coding equipment for nonlocked sampling. Assume that an input video signal is an NTSC color TV signal. Since two color signals are frequency multiplexed on the luminance signal in the NTSC signal, a high-order predictive coding method (i.e., J. YAMAGATA, H. TAKASHIMA, N. BANDO and T. DOI, "Asynchronous Intra-frame Coding with One-Dimensional Prediction", IEEE '81, Nos. 62, 1.1–62, 1.5) is introduced to predict input signals by using values of plural picture elements within a scanning line so as to perform nonlocked sampling. However, in the case of locked sampling, a two-dimensional predictive coding method (e.g., K. SAWADA and H. KOTERA, "NTSC Color TV Composite DPCM Coding System", Review of the Electrical Communication Laboratories, Vol. 27, Nos. 11–12, Nov.–Dec., 1979) is adopted utilizing correlation between the scanning lines. These coding methods have greatly different coding algorithms. In order to use both these coding methods in a single equipment, the equipment configuration is inevitably complicated.

From the viewpoint of users, if a user wishes to have coding equipment capable of coding signals of different quality, he will use coding equipment (A-type) which has two coding functions for locked sampling and nonlocked sampling, although the equipment becomes slightly expensive. The following cases may also be expected. If another user requires only a picture quality as low as that obtained by nonlocked sampling coding for all signal sources, he uses inexpensive nonlocked sampling coding equipment (B-type). Furthermore, if still another user who does not wish to code a signal (such as the output from a portable VTR) which has a great frequency deviation, he uses coding equipment (C-type) for only locked sampling. In this manner, it is considered that various types of coding equipment are present in the video communication network. Therefore the user who uses A-type equipment must select properly one of the two coding functions in order to communicate with different type of equipments.

SUMMARY OF THE INVENTION

It is, therefore, an object of the present invention to provide coding equipment which allows one to select a suitable coding method in a communication network for a video signal in accordance with the quality of a video signal source or with the type of distant decoding equipment, thereby performing optimum coding in the given network.

In order to achieve the above object, there is provided according to the present invention coding equipment having a coding means selectively adapted to one of the two coding algorithms.

A first coding algorithm is used for coding a high-quality video signal which can be sampled by locked sampling. According to an embodiment of the present invention, the first coding algorithm corresponds to a predictive coding method wherein a signal value which comprises a single picture element or a plurality of picture elements between the present scanning line and the Nth scanning line previous to the present line is used for prediction.

A second coding algorithm is for coding a video signal which does not allow locked sampling. According to the embodiment of the present invention, the second coding algorithm corresponds to a predictive coding method wherein a signal value which comprises a single picture element or a plurality of picture elements on the single scanning line, is used for prediction.

The switching of the coding algorithms is controlled in accordance with a degree of frequency deviation of the signal included in the input video signal. A switching controlling means is arranged to control the switching of the coding algorithms.

The switching between locked sampling and nonlocked sampling is performed simultaneously when the coding algorithms are switched. By this switching operation, the clock pulse is switched from a locked sampling clock to a nonlocked sampling clock, or vice versa. This switching can be controlled by the same switching controlling means as described above.

In the public communication network for digital video signals, various types of coding and decoding equipment such as equipment which has the two coding algorithms described above, and equipment which has only one of the two coding algorithms, are connected to each other. In order to select an equipment coding algorithm which matches that of the corresponding (distant) equipment, data which indicate the type of coding algorithm of the receiving-side equipment are transmitted from the receiving-side equipment to the sending-side equipment. The sending-side equipment receives the data which are then supplied to the switching controlling means.

Other objects, the features and advantages of the invention will be apparent from the following detailed description when read with the accompanying drawing which shows, by way of example and not limitation, apparatus for realizing the presently preferred embodiment of the invention.

BRIEF DESCRIPTION OF THE DRAWINGS

FIGS. 10A to 10C are timing charts for explaining the operation of the frequency deviation detector, in which FIG. 10A shows a switching operation from nonlocked ampling to locked sampling, FIG. 10B shows a switching operation from locked sampling to nonlocked sampling, and FIG. 10C shows a switching operation to locked sampling after video signals are newly input;

DETAILED DESCRIPTION OF THE PREFERRED EMBODIMENT

Figure 1:
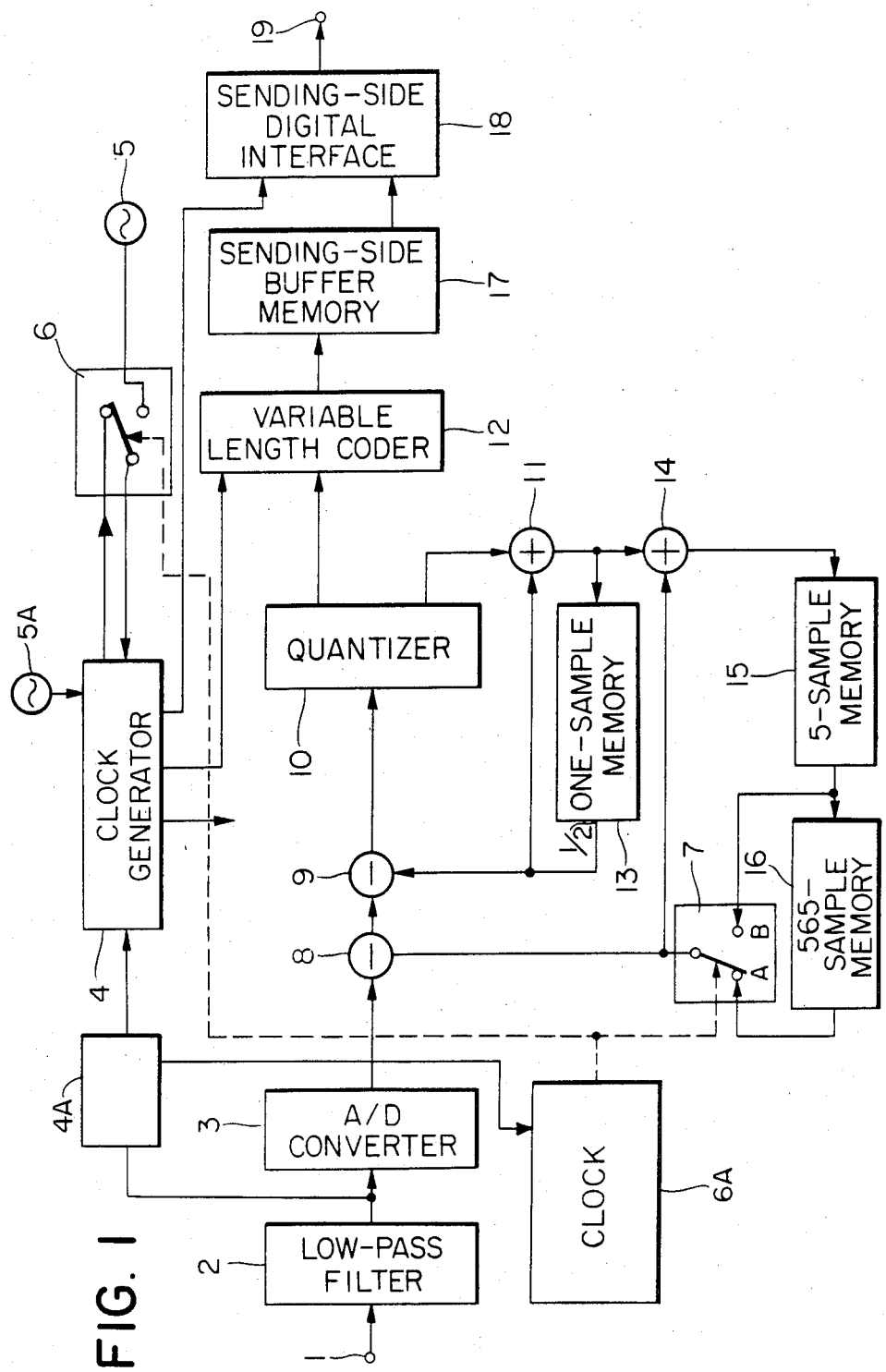
FIG. 1 is a block diagram of coding equipment according to an embodiment of the present invention.

FIG. 1 is a block diagram of coding equipment for explaining a coding method according to an embodiment of the present invention. Reference numeral 1 denotes a video signal input; 2, a low-pass filter; 3, an analog-to-digital (A/D) converter; 4, a clock generator; 4A, a sync separator; 5, a clock source; 5A a second clock source; 6, a locked/nonlocked sampling switch; 6A, a clock, algorithm selection control; 7, a switch; 8 and 9, subtractors; 10, a quantizer; 11 and 14, adders; 12, a variable length coder; 13, a one-sample memory; 15, a 5-sample memory; 16, a 565-sample memory; 17, a sending-side buffer memory; 18, a sending-side digital interface; and 19, a data output.

NTSC video signals supplied to the video signal input 1 are filtered by the low-pass filter 2 so as to eliminate a frequency component. The NTSC video signals are then supplied to the A/D converter 3 and the sync generator 2A.

The analog signals from the low-pass filter 2 are sampled and converted by the A/D converter 3 to digital signals. Meanwhile, a sync signal is separated by the sync separator 2A from the analog signal utilizing the output signal from the low-pass filter 2. The clock generator 4 then generates a locked sampling clock signal from clock source 5A which has synchronized phase with that of the sync signal. The clock generator 4 alternatively generates a nonlocked sampling clock signal from a clock signal supplied from the clock source 5. More specifically, in the locked sampling mode, the clock generator 4 generates a sampling clock signal having a frequency of $2.5 \times f_{SC}$ where $f_{SC}$ is the subcarrier frequency. However, in the nonlocked sampling mode, the clock generator 4 generates an 8.9484-MHz ($\approx 2.5 f_{SC}$) sampling clock signal.

The switching between locked/nonlocked sampling modes is performed by the clock algorithm selection control 6A which operates the locked/nonlocked sampling switch 6. The selection control 6A measures a deviation in frequency of the horizontal sync signal and determines whether or not the measured value falls within a threshold range (e.g., within ±30 ppm) and generates a switching control signal to switch 6. More specifically, the locked/nonlocked sampling switch 6 controls the clock generator 4 to set the locked sampling mode when the measured value falls within the threshold range. Otherwise, the clock generator 4 is set in the nonlocked sampling mode. In addition to the switching of the clock generator 4, the selection control 6A also controls the switch 7 for switching the coding algorithm of the coder. The switch 7 is switched to the side of contact A in the locked sampling mode, whereas it is switched to the side of contact B in the nonlocked sampling mode.

The digital signals from the A/D converter 3 are subjected to subtraction by the subtractor 8 therefrom of a predictive value supplied through the switch 7. First order error values or difference signals by the subtractor 8 are supplied from the subtractor 8 to the subtractor 9.

Figure 2A:
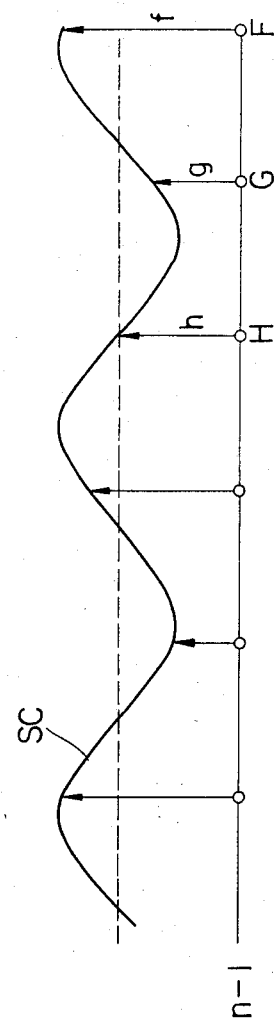
FIGS. 2A and 2B shows the relationship between phases of input signals supplied to a subtractor shown in FIG. 1.
Figure 2B:
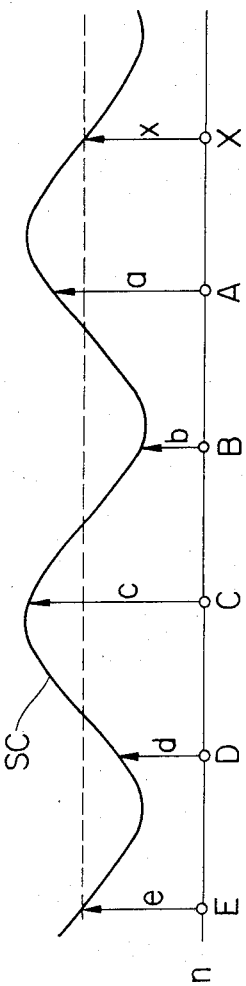

FIGS. 2A and 2B show the relationship between the phases of the input NTSC signals supplied to the subtractor 8 shown in FIG. 1. Reference symbol SC denotes a subcarrier component; and n−1 and n, scanning line numbers. Capital letters designate picture elements, respectively. Small letters designate signal values of the picture elements, respectively.

If it is assumed that a signal value x of a picture element X is supplied to the subtractor 8, the signal value (predictive value) of the picture element supplied through the switch 7 is h (the value of the 570th previous picture element) and is e (the value of the 5th previous picture element).

In the above case, the picture element which is the same phase as that of the picture element X is used as the predictive value.

When the signal supplied from the A/D converter 3 is the same color as in the predictive value (from the switch 7) of the 5th and 570th previous picture elements, the subcarrier component (i.e., chrominance signal component) is not included in the output signal from the subtractor 8, which comprises only the luminance signal.

The subtractor 9 subtracts the output signal of the one-sample memory 13 from the output signal of the subtractor 8 to reduce redundancies in the luminance signal.

The quantizer 10 quantizes an output (i.e., a second order predictive error signal) from the subtractor 9, and supplies quantizing values to the adder 11. The quantizer 10 supplies codes which indicate quantizing levels to the variable length coder 12.

The adder 11 adds the quantizing values from the quantizer 10 to values from the one-sample memory 13. Summed data are then stored in the one-sample memory 13 such that the stored signals are halved so as to decrease power of predictive error. The halved data are then read out from the one-sample memory 13 and are supplied to the subtractor 9 and the adder 11 for the next sample.

The output signals from the adder 11 are also supplied to the adder 14 and are added, through the switch 7, to data which are read out either from the 5-sample memory 15 or the 565-sample memory 16. The summed data are then stored in the 5-sample memory 15 or the 565-sample memory 16 and are used as the predictive value of the next sample.

The variable length coder 12 assigns shorter codes to the quantizing levels from the quantizer 10 in which the levels frequently occur. The variable length coder 12 also assigns longer codes to the quantizing levels from the quantizer 10 in which the levels do not frequently occur. The variable length coder 12 multiplexes a signal (from the clock generator 4) which indicates locked sampling or nonlocked sampling and the quantized output by time-division multiplexing.

The sending-side buffer memory 17 smooths signals nonuniformly supplied from the variable length coder 12 and sends data at the fixed transmission rate.

The sending-side digital interface 18 time-division multiplexes signals from the sending-side buffer memory 17 and a signal which is supplied from the clock generator 4 and which indicates the sampling frequency. The sending-side digital interface 18 then converts signals to transmission line codes which are then supplied onto a digital transmission line through the data output 19.

Figure 3:
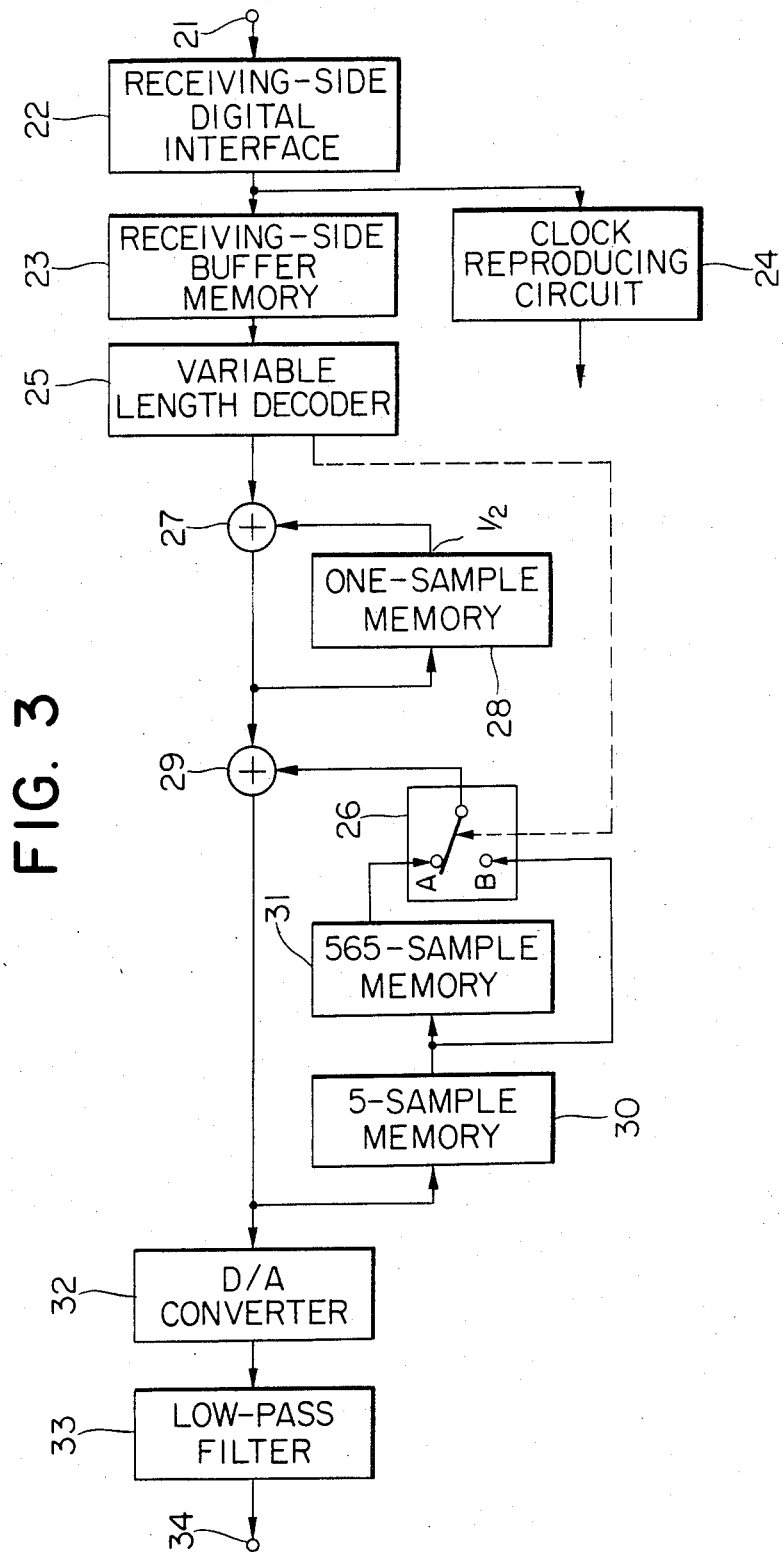
FIG. 3 is a block diagram of decoding equipment according to the embodiment of the present invention.

FIG. 3 is a block diagram of decoding equipment according to the present invention. Reference numeral 21 denotes a data input; 22, a receiving-side digital interface; 23, a receiving-side buffer memory; 24, a clock reproducing circuit; 25, a variable length decoder; 26, a switch; 27 and 29, adders; 28, a one-sample memory; 30, a 5-sample memory; 31, a 565-sample memory; 32, a D/A converter; 33, a low-pass filter; and 34, a video signal output.

Data encoded by the coding equipment shown in FIG. 1 and transmitted to the receiving-side equipment through the transmission line are supplied to the data input 21 of the decoding equipment. These data are then converted by the receiving-side digital interface 22 from the transmission codes to the codes which have suitable format for decoding. The decoded signal is then supplied to the receiving-side buffer memory 23 and the clock reproducing circuit 24.

The receiving-side buffer memory 23 stores data which are sent at fixed transmission rate and the data are sequentially read out synchronized with the decoding speed.

The clock reproducing circuit 24 then reproduces the sampling clock required for decoding by separating the signal which indicates the sampling frequency from the receiving-side digital interface 22.

The variable length decoder 25 decodes output data read out from the receiving-side buffer memory 23. The signal which indicates locked or nonlocked sampling is supplied to the switch 26, and the signals which indicate the quantizing levels are supplied to the adder 27.

The adder 27 and the one-sample memory 28 constitute a decoding loop for a previous picture element prediction for a previous value. Decoded values from the adder 27 are supplied to the adder 29. It is noted that data stored in the one-sample memory 28 are halved in the same manner as in the one-sample memory 13 in the coding equipment.

The adder 29, the 5-sample memory 30, the 565-sample memory 31 and the switch 26 constitute a decoding loop for the color signal component. The decoded signals are supplied to the D/A converter 32. It is noted that the switch 26 is switched to the side of contact A in the locked sampling mode and to the side of contact B in the nonlocked sampling mode in a similar manner as the switch 7.

The D/A converter 32 converts the decoded digital signals to analog signals. The analog signals are then supplied to the low-pass filter 33 which then eliminates the aliasing noise. The NTSC signals are thus supplied from the low-pass filter 33 to the video signal output 34.

The above description is concerned with the case in which a predictive value is obtained by a single picture element value in both the locked and nonlocked sampling modes in accordance with the assumptions that the NTSC signals are sampled at a frequency of about 2.5 $f_{SC}$, the picture elements of the 570th previous picture elements are used for prediction in the locked sampling mode, and the picture elements of the 5th previous picture elements are used as the predictive value in the nonlocked sampling mode. The present invention is, however, not limited to the above case. It is readily understood that a signal value which comprises a plurality of picture element values in method such as the high-order predictive coding method may be used.

As described above, the frequency deviations of the sync signal in the NTSC signal are compared with each other, thereby switching the locked and nonlocked sampling, and predictive coding methods. Therefore, the present invention has an advantage in that a single item of coding equipment is required to code any video signals of different quality. Furthermore, the coding algorithm of the present invention is constituted by two predictive loops, so that the actual circuit can be arranged only by connecting two LSIs in this coding equipment, thereby providing compact, low-power and economic coding equipment.

Figure 4:
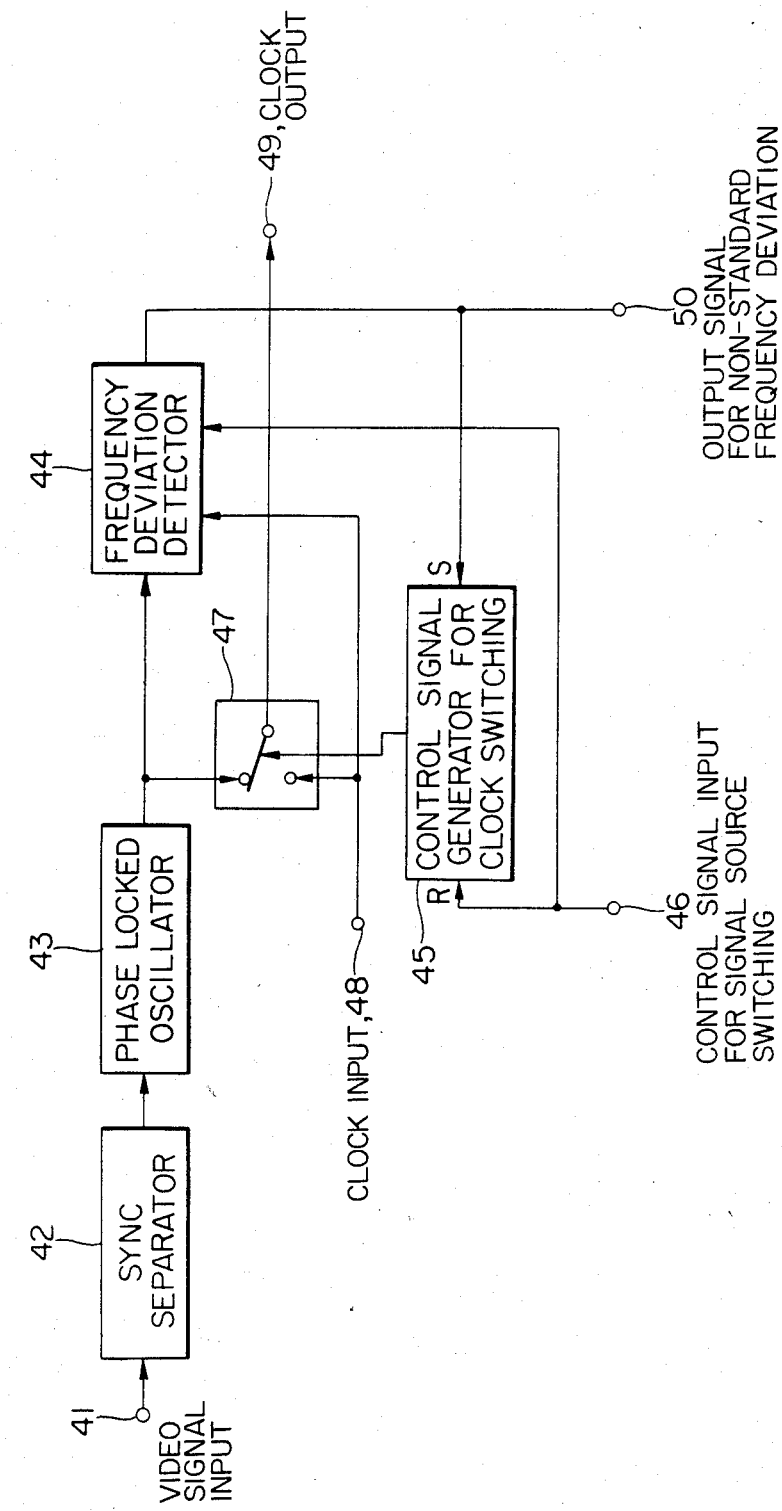
FIG. 4 is a block diagram of a circuit partially showing a clock generator and a locked/nonlocked sampling switch.

A circuit which can be used in place of the clock generator 4, the source 5A, the switch 6 and the clock selection control 6A shown in FIG. 1 will be described with reference to FIG. 4. Reference numeral 41 denotes a video signal input; 42, a sync separator; 43, a phase locked oscillator; 44, a frequency deviation detector; 45, a control signal generator for clock switching; 46, a control signal input for signal source switching; 47, a switch; 48, an external clock input; and 49, a clock output. A circuit constituted by the sync separator 42, the phase locked oscillator 43 and the frequency deviation detector 44 corresponds to the sync separator 4A, source 5A and the selection control 6A shown in FIG. 1. A circuit constituted by the sync separator 42, the phase locked oscillator 43, the control signal generator for clock switching 45 and the switch 47 corresponds to the sync separator 4A, source 5A, selection control 6A and switch 7 in FIG. 1. Video signals from the video signal input 41 are supplied to the sync separator 42 which separates the horizontal sync signals from the video signals. The separated horizontal sync signals are supplied to the phase locked oscillator 43 which then generates a clock signal whose phase is synchronized with the horizontal sync signal supplied thereto. The clock signal is supplied to the frequency deviation detector 44 and the switch 47. The frequency deviation detector 44 detects whether or not the frequency of the output signal from the phase locked oscillator 43 falls within a predetermined range. If the frequency does not fall within the predetermined range, the frequency deviation detector 44 sends out a signal of non-standard frequency deviation to output 50.

The control signal generator for clock switching 45 comprises, for example, an R-S flip-flop. The control signal generator for clock switching 45 is reset when a control signal for signal source switching is supplied to its corresponding input 46. The control signal generator for clock switching 45 is set by the signal of non-standard frequency deviation from the frequency deviation detector 44. The control signal generator for clock switching 45 then supplies its output signal to the switch 47. When this signal is set to logic level "0", the switch 47 is switched to supply the output (i.e., locked sampling clock) from the phase locked oscillator 43. However, when the signal from the control signal generator for clock switching 45 goes high (i.e., logic level "1"), the switch 47 is switched to the external clock input 48, thereby supplying the nonlocked sampling clock to the clock output 49.

Figure 5:
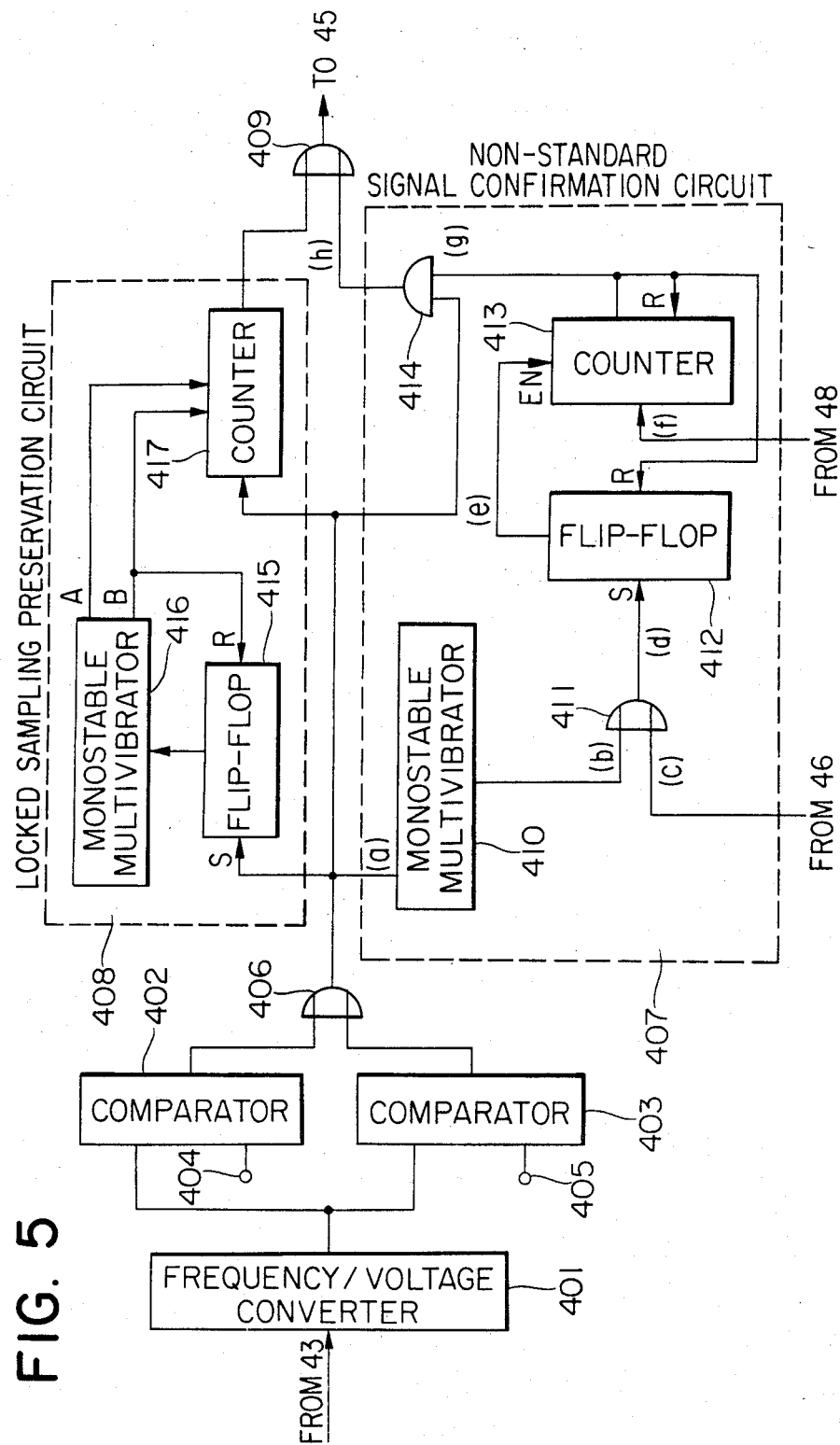
FIG. 5 is a block diagram of a frequency deviation detector shown in FIG. 4.

FIG. 5 shows a detailed arrangement of the frequency deviation detector 44. Reference numeral 401 denotes a frequency/voltage converter; 402 and 403, comparators; 404 and 405, reference voltage terminals; 406 and 409, OR gates; 407, a non-standard signal confirmation circuit which detects a signal (e.g., from a portable VTR) whose sync frequency is constantly deviated from the standardized sync frequency; and 408, a locked sampling preservation circuit which prevents the locked sampling clock from switching to the nonlocked sampling clock, although this switching tends to occur due to a frequency deviation in the broadcast TV signal when one TV camera is switched to another.

The frequency/voltage converter 401 counts the clocks from the phase locked oscillator 43 and converts the frequency to a voltage. This voltage signal is supplied to the comparators 402 and 403 and is compared by the comparators 402 and 403 with predetermined reference voltages. A voltage corresponding to $+30$ ppm with respect to the 15.734256-kHz standard horizontal sync signal of the television signal is set and appears at the reference voltage terminal 404. A voltage corresponding to $-30$ ppm with respect to the standard signal is set and appears at the reference voltage terminal 405.

When the output voltage from the frequency/voltage converter 401 is lower than the reference voltage at the reference voltage terminal 404, the comparator 402 produces an output signal of level "1". Similarly, the comparator 403 produces an output signal of level "1" when the output voltage from the frequency/voltage converter 401 is lower than the reference voltage at the reference voltage terminal 405. The output signals from the comparators 402 and 403 are logic-ORed by the OR gate 406.

The non-standard signal confirmation circuit 407 will now be described hereinafter. Reference numeral 410 denotes a monostable multivibrator; 411, an OR gate; 412, an R-S flip-flop; 413, a counter; and 414, an AND gate.

Figure 6:
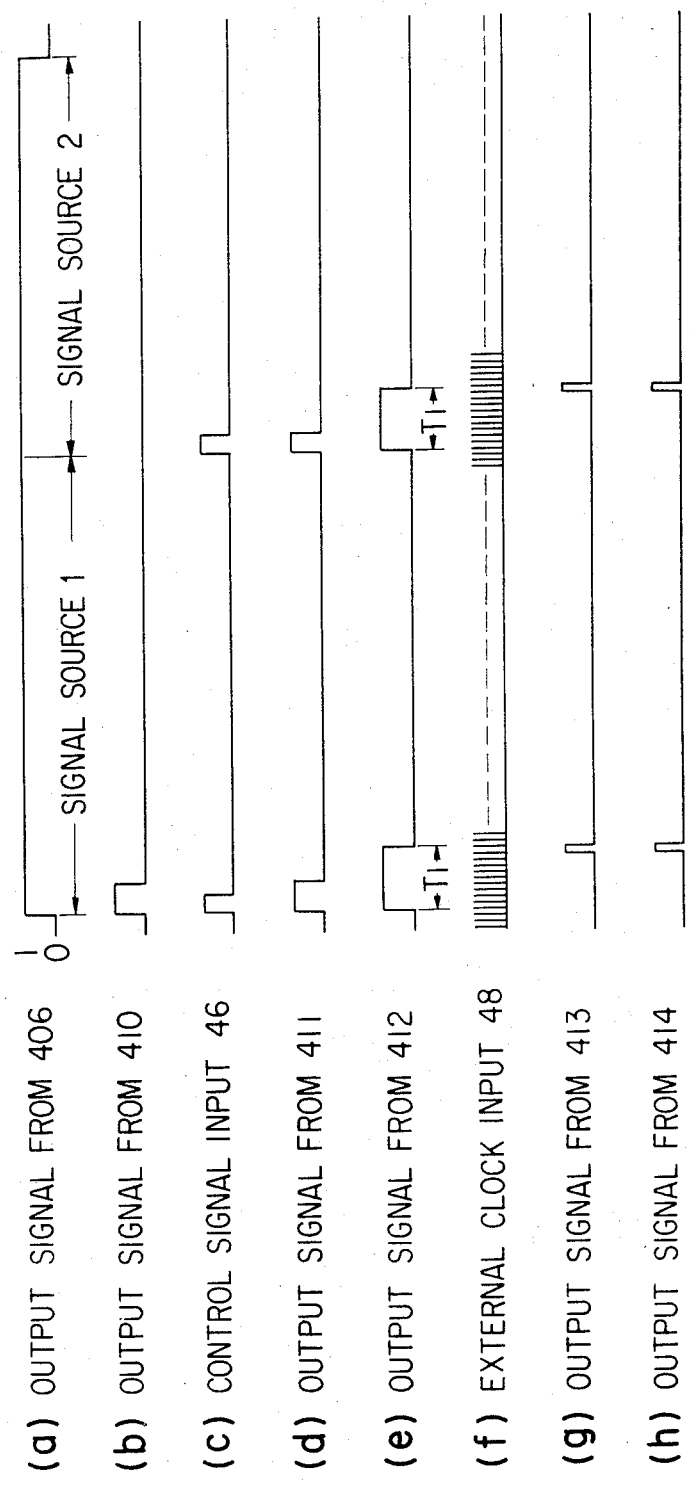
FIG. 6 is a timing chart for explaining the operation of a frequency deviation detector shown in FIG. 5.

The operation of the circuit will be described with reference to the timing chart in FIG. 6. In an output signal (a) from the OR gate 406 two signals consecutively appear. An output signal (b) from the monostable multivibrator 410 is kept to logic level "1" for a predetermined time interval after the signal (a) rises.

A control signal (c) is supplied to the control signal input for signal source switching 46. For example, when the coding and decoding equipment of the present invention is used in a communication network, this signal (c) is supplied from an exchange to the input 46 every time a call is made. In this embodiment, the control signal for signal source switching is externally supplied. However, by checking the presence or absence of the output signal from the sync separator 42, the control signal for signal source switching may be internally generated.

An output signal (d) from the OR gate 411 is supplied to the R-S flip-flop 412 which is then set, thereby enabling the counter 413.

The counter 413 counts pulses (f) supplied from the external clock input 48. When the count of the counter 413 has reached a predetermined number, the counter 413 supplies a pulse (g) to the AND gate 414 and to the R-S flip-flop 412. As a result, the R-S flip-flop 412 is reset, so that the counter 413 is disabled. A time interval $T_1$ in the signal (e) corresponds to a count enable period. When the phase locked oscillator 43 is kept in the free-running state during the time interval $T_1$, the input video signal is determined as a non-standard signal. This determination is performed by the AND gate 414 which then produces an output pulse (h).

Figure 7:
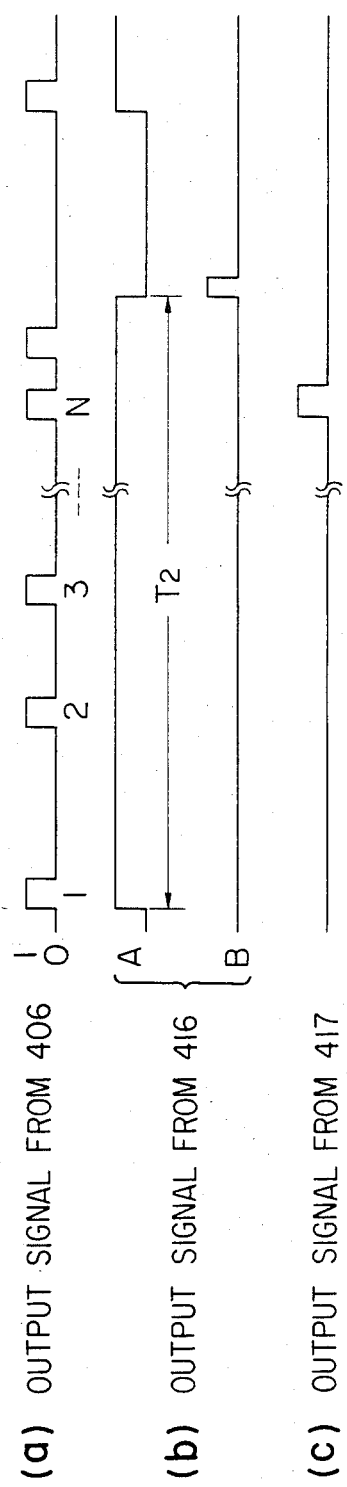
FIG. 7 is a timing chart for explaining the operation of a locked sampling preservation circuit shown in FIG. 5

The locked sampling preservation circuit 408 will now be described. Referring to FIG. 5, reference numeral 415 denotes an R-S flip-flop; 416, a monostable multivibrator; and 417, a counter. The modes of operation of these circuit elements will be described with reference to the timing chart in FIG. 7. The output signal (a) from the OR gate 406 indicates the times at which the television cameras are switched. When a frequency deviation occurs in this condition, the output signal (a) from the OR gate 406 rises to logic level "1".

The R-S flip-flop 415 is set when the signal (a) goes to logic level "1". The monostable multivibrator 416 is then enabled. The monostable multivibrator 416 supplies a signal (b) of logic level "1" onto a signal line A for a predetermined time interval $T_2$. The monostable multivibrator 416 then supplies a pulse onto a signal line B when the signal on the signal line A falls.

The counter 417 counts pulses from the OR gate 406 for the time interval $T_2$. When the count of the counter 417 does not reach a predetermined threshold N, the counter 417 sends out a signal of logic level "0". Therefore, any signal is not supplied to the OR gate 409, and the locked sampling mode may not be switchd to the nonlocked sampling mode. However, when the count of the counter 417 exceeds the predetermined threshold N, the counter 417 determines that locked sampling is difficult to continue. The counter 417 then produces a pulse (c) shown in FIG. 7. As a result, the OR gate 409 is enabled. The OR gate 409 enables the clock switching signal generator 45 which then supplies a signal to the switch 47. As a result, the switch 47 is switched from the locked sampling mode to the nonlocked sampling mode.

In the above description, the frequency of the input signal to the frequency deviation detector 44 is converted by the frequency/voltage converter 401 to the analog voltage. This analog voltage is compared by the comparators 402 and 403 with the reference voltages. However, the above analog signal processing may be replaced with a digital signal processing.

Figure 8:
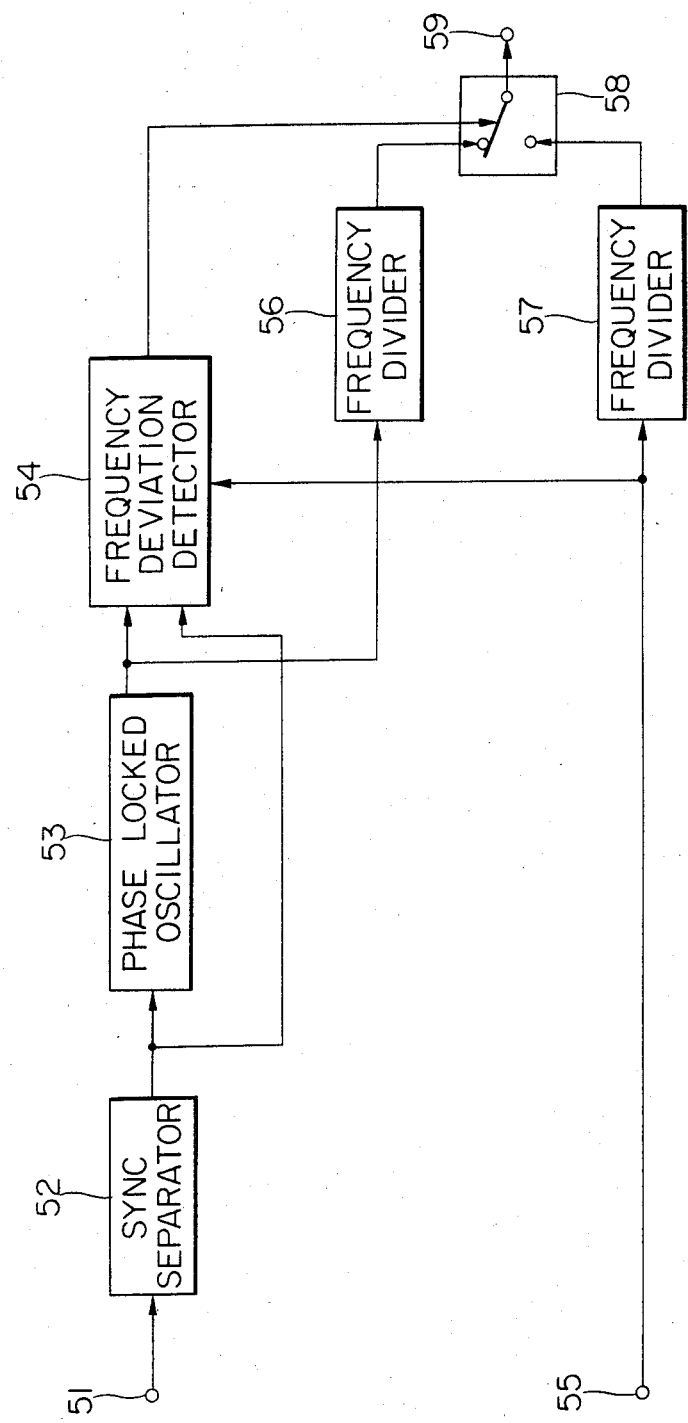
FIG. 8 is a block diagram of another circuit partially showing a clock generator and a locked/nonlocked sampling switch, which is an improvement of the circuit shown in FIG. 4.

FIG. 8 shows another circuit for detecting whether or not the sync frequency falls within a predetermined range so as to generate a switching control signal, and for selectively generating a locked or nonlocked sampling clock in accordance with the switching control signal. The circuit shown in FIG. 8 is an improved arrangement of the circuit shown in FIG. 4. Referring again to FIG. 4, the switch 47 is switched to the output side of the phase locked oscillator 43 only immediately after the call is made. For this reason, when signals from a VTR which has a great frequency deviation is supplied, the switch 47 is switched to set the nonlocked sampling mode. Even if the user switches the signal to a camera output which has a small frequency deviation thereafter, the nonlocked sampling clock may not be switched to the locked sampling clock, resulting in inconvenience. The circuit shown in FIG. 8 is arranged to eliminate this drawback and has advantages in that: (1) frequent switching between the clocks is prohibited when the frequency of the sync signal in the input video signal is in the vicinity of predetermined threshold; (2) switching between the clocks is prohibited when the video signal having a small frequency deviation is only temporarily interrupted; and (3) switching is performed from the nonlocked sampling clock to the locked sampling clock after a change from a non-input state to an input state of a video signal having a small frequency deviation is detected.

Referring to FIG. 8, the video signal supplied to a video signal input 51 is then supplied to a sync separator 52. The sync separator 52 separates a horizontal sync signal from the video signal. The separated horizontal sync signal is input to a phase locked oscillator 53 and to a frequency deviation detector 54.

When the phase locked oscillator 53 receives the output signal from the sync separator 52, the phase locked oscillator 53 generates a clock which is synchronized with the horizontal sync signal. The sync clock thus obtained is supplied to the frequency deviation detector 54 and a frequency divider 56.

The frequency deviation detector 54 detects whether or not the frequency of the output signal from the phase locked oscillator 53 falls within a predetermined frequency range. The frequency deviation signal then supplies a switching control signal to a switch 58.

The frequency divider 56 frequency-divides the output signal from the phase locked oscillator 53 and produces a locked sampling clock.

A clock signal (e.g., transmission line clock) is supplied from an external clock input 55 to a frequency divider 57. The frequency divider 57 then frequency-divides this signal and generates a nonlocked sampling clock.

The switch 58 is switched to supply one of the signals from the frequency dividers 56 and 57 in accordance with the switching control signal. The selected signal is then supplied to a clock output 59. This clock is used as a sampling clock for the video signal or as a clock for processing.

Figure 9:
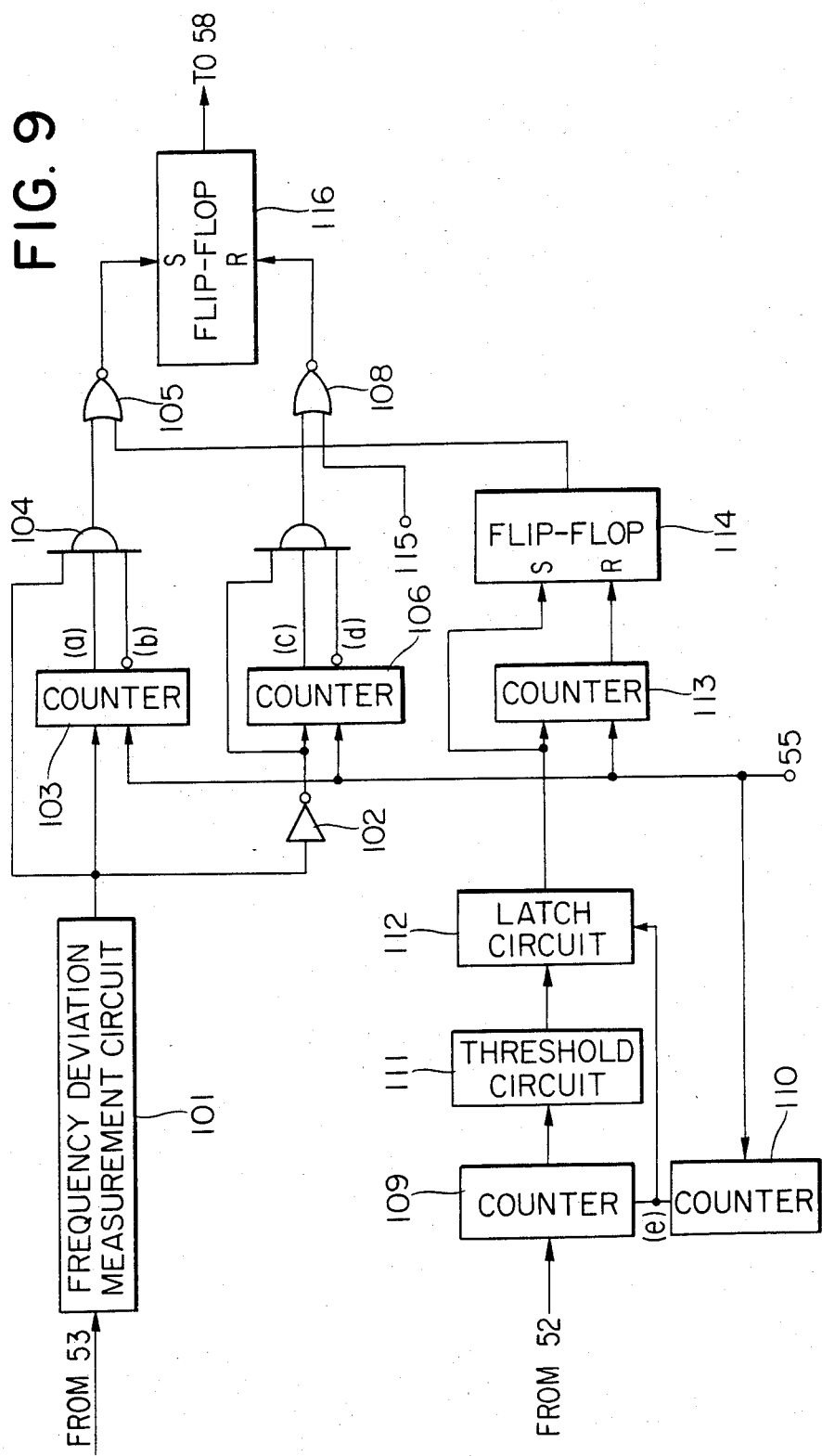
FIG. 9 is a block diagram of a frequency deviation detector shown in FIG. 8.

FIG. 9 is a detailed block diagram of the frequency deviation detector 54. FIGS. 10A to 10C are timing charts for explaining the operation of the frequency deviation detector 54. Referring to FIG. 9, reference numeral 101 denotes a frequency deviation measurement circuit; 102, an inverter; 103, 106, 109, 110 and 113, counters; 104 and 107, AND gates; 105 and 108, NOR gates; 111, a threshold circuit; 112, a latch circuit; 114 and 116, flip-flops; and 115, a power-on status signal input.

The frequency deviation measurement circuit 101 measures the frequency of the signal supplied from the phase locked oscillator 53. If the frequency falls within a predetermined frequency range (e.g., ±30 ppm) with respect to a center frequency f, the frequency deviation measurement circuit 101 produces a signal of logic level "1". Otherwise, the frequency deviation measurement circuit 101 produces a signal of logic level "0". The signal from the frequency deviation measurement circuit 101 is supplied to the inverter 102, the counter 103 and the AND gate 104.

When the frequency of the input video signal is in the vicinity of these thresholds, the counter 103 provides a switching prohibition period for N seconds (e.g., 60 seconds) so as to prevent frequent switching between locked and nonlocked sampling. The counter 103 starts counting the clocks supplied from the external clock input 55 when the output signal from the frequency deviation measurement circuit 101 goes to logic level "1" (i.e., when the frequency deviation exceeds the range of ±30 ppm). When N seconds have elapsed, the counter 103 generates a signal (a) which goes high (logic level "1") after N seconds have elapsed. The counter 103 also generates a signal (b) which goes low (logic level "0") when (N+G) seconds (G is any short time interval) have elapsed. These signals are supplied to the AND gate 104. The AND gate 104 produces a signal of logic level "1" for the time interval of G seconds. This signal is supplied to the OR gate 105. As may be apparent from FIG. 10A, even if the output signal from the frequency deviation measurement circuit 101 goes to logic level "0" again (i.e., the frequency deviation exceeds the range of ±30 ppm) within N seconds, the AND gate 104 does not produce a signal of logic level "1". The counter 103 is cleared after each time interval of (N+G) seconds.

Assume that a signal such as a broadcast television signal which has a small frequency deviation is supplied as the input video signal. In this case, the sync signal temporarily disappears when the television cameras are switched. However, thereafter, the sync signal with high precision (i.e. small frequency deviation) is supplied. The counter 106 is arranged to prevent switching from the locked sampling mode to the nonlocked sampling mode in such a case by providing a gate period of M seconds. When the output signal from the inverter 102 goes to logic level "1", that is, when the frequency deviation of the input video signal exceeds the range of ±30 ppm, the counter 106 is started. The counter 106 then counts clocks supplied from the external clock input 55. The counter 106 produces a signal (c) which goes to logic level "1" after M seconds (i.e., 2 seconds) have elapsed, and also produces a signal (d) which goes to logic level "0" after (M+G) seconds. These signals are supplied to the AND gate 107, which produces a signal which is kept at logic level "1" for G seconds. This signal is then supplied to the NORgate 108. As may be apparent from FIG. 10B, when the output signal from the inverter 102 goes again to logic level "0" in less than M seconds, that is, when the frequency deviation falls again within the range of ±30 ppm in less than M seconds, the AND gate 107 does not produce the signal of logic level "1". The counter 106 is cleared when a time interval of (M+G) seconds has elapsed and the counter 106 produces the count signal.

As may be apparent from the above description, frequent switching between the locked sampling mode and the nonlocked sampling mode is prevented. However, when the input signal which has a small frequency deviation is supplied as an input video signal after the non-input state, a switch must be made from the nonlocked sampling mode to the locked sampling mode, instead of maintaining the nonlocked sampling mode for as long as N seconds (e.g., 60 seconds). For this purpose, the counter 109 is used. FIG. 10C is the timing chart for explaining this control operation.

The counter 109 counts the pulses of the horizontal sync signal from the sync separator 52 every L seconds (e.g., every 4 seconds), and sends out the count. A reset clock (e) is supplied every L seconds from the counter 110 to the counter 109. The counter 110 counts the clocks of a predetermined period. These clocks are supplied from the external clock input 55 to the counter 110. The counter 110 then generates pulses (e) every L seconds. When the count of the counter 109 is greater than a threshold $T_H$, the threshold circuit 111 produces a signal of logic level "1". Otherwise, the threshold circuit 111 produces a signal of logic level "0". The latch circuit 112 latches the output signals from the threshold circuit 111 in which output signal from the counter 110 is used as clocks. The latched signals are then supplied to the counter 113.

The counter 113 starts counting clocks supplied from the external clock input 55 when the output signal from the latch 112 goes to logic level "1". The counter 113 produces a signal which goes to logic level "0" in G seconds and is kept at logic level "1" during any other period. The flip-flop 114 is set by the signal from the latch 112, and then reset by the signal from the counter 113. Namely, the flip-flop 114 produces a signal which is kept at logic level "1" for G seconds. This signal is supplied to the NOR gate 105. Therefore, within L seconds after the video signal is supplied, a switch can be made from the nonlocked sampling mode to the locked sampling mode.

The NOR gate 105 receives the output signals from the AND gate 104 and the flip-flop 114. The NOR gate 105 then produces a signal of logic level "0" when one of its input signals is kept high. The NOR gate 108 receives the output signal from the AND gate 107 and the signal from the power-on status signal input 115. The NOR gate 108 produces a signal of logic level "0" when one of its input signals is kept high. Only when the power is ON, the signal of logic level "1" is supplied to the power-on status signal input 115. The output from the NOR gate 105 falls down to logic level "0", then the flip-flop 116 is set. However, when the output signal from the NOR gate 108 falls down to logic level "0", the flip-flop 116 is reset. The output signal from the flip-flop 116 (i.e., the output signal from the frequency deviation detector 54) controls the switch 58. When the output signal from the flip-flop 116 is set to logic level "1", the switch 58 is connected to the frequency divider 56. However, when the output signal from the flip-flop 116 is set to logic level "0", the switch 58 is connected to the frequency divider 57. This switching is controlled from the nonlocked sampling mode when the pulse of logic level "1" is supplied to the power-on status signal input 115. Thereafter, the switching is controlled in accordance with the frequency precision of the input video signal.

In the above embodiment, the phase is synchronized with the horizontal sync signal. However, the phase may be synchronized with a color burst. In this case, the color burst is separated by the sync separator 52 to produce a signal of the subcarrier frequency. The phase locked oscillator 53 and the frequency deviation detector 54 are operated under the subcarrier frequency in place of the horizontal sync frequency so as to obtain the same effect as in the above embodiment.

As described above, switching between the locked sampling mode and the nonlocked sampling mode, and switching between the two coding algorithms are performed in accordance with the frequency deviation of the sync signal in the input video signal. Furthermore, the above switching operations may be controlled in accordance with the type of coding equipment of the distant (receiving-side) device. This will be described with reference to FIGS. 11 to 13.

Figure 11:
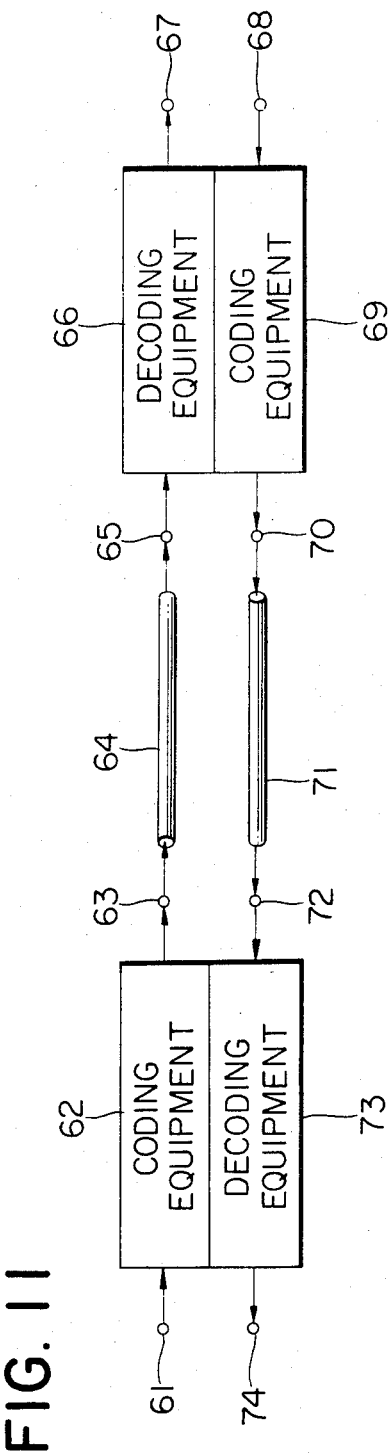
FIG. 11 shows a mutual connection of the coding and decoding equipment according to the embodiment of the present invention.

FIG. 11 shows two pairs of coding and decoding equipment which are connected to each other. Coding equipment 62 is connected to decoding equipment 66 through a forward transmission line 64. Coding equipment 69 is connected to decoding equipment 73 through a backward transmission line 71. In the following description, locked coding means that an input video signal is sampled by locked clocks and is coded by the suitable coding algorithm. Otherwise, coding is called nonlocked coding. Assume that coding and decoding equipment which is available for both locked and nonlocked coding is defined as A-type equipment, nonlocked coding and decoding equipment is defined as B-type equipment, and locked coding and decoding equipment is defined as C-type equipment.

The coding and decoding equipment 62 and 73 comprises A-type equipment, and the coding and decoding equipment 69 and 66 comprises B-type equipment, respectively.

The A-type coding equipment 62 determines locked coding or nonlocked coding in accordance with the type of video signal supplied to a video signal input 61. This determination is performed in accordance with the degree of frequency deviation of the sync signal or the like. When the frequency deviation exceeds the range of ±30 ppm, nonlocked coding is performed. Otherwise, locked coding is performed.

The A-type coding equipment 62 receives equipment-type data which is supplied from the B-type coding equipment 69 to the A-type decoding equipment 73. Since the equipment-type data indicates B-type equipment, the A-type coding equipment 62 performs nonlocked coding even if the frequency deviation of the input video signal falls within the range of ±30 ppm, so as to achieve coupling. Assume the coding and decoding equipment is A-type or C-type. When the equipment-type data supplied from the B-type coding equipment 69 indicate the A- or C-type equipment and when the frequency deviation falls within the range of ±30 ppm, the A-type coding equipment 62 performs locked coding. Furthermore, when the equipment-type data supplied from the coding equipment 69 indicate the C-type equipment and when the frequency deviation of the input video signal exceeds the range of ±30 ppm, the A-type coding equipment 62 signals to the user that coding cannot be performed. Thus, the A-type coding equipment 62 does not perform coding.

Figure 12:
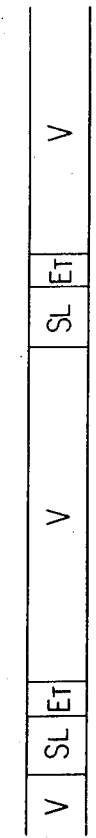
FIG. 12 shows a transmission frame format for explaining the transmission method of equipment type data.

FIG. 12 shows a transmission frame format on the backward transmission line 71 so as to explain the method for transmitting the equipment-type data described above. Reference symbol $S_L$ denotes transmission frame synchronization word pattern; $E_T$, equipment-type data; and V, digital video data.

The transmission frame synchronization word pattern $S_L$ is a frame sync signal. The equipment-type data $E_T$ can be separated on the basis of the word pattern $S_L$. The frame format of the forward transmission line 64 is the same as that shown in FIG. 12.

The A-type decoding equipment 73 receives the equipment-type data $E_T$ from the distant coding equipment 69. The A-type coding equipment 62 then detects what type can match with the decoding equipment 66. If $E_T$ indicates that distant coding equipment 69 and decoding equipment are B-types, the A-type coding equipment 62 then performs nonlocked coding and transmits nonlocked coded data onto the forward transmission line 64 through a data output 63. In this case, the nonlocked coding mode which is inserted in the control data is sent to the receiving-side equipment.

Figure 13:
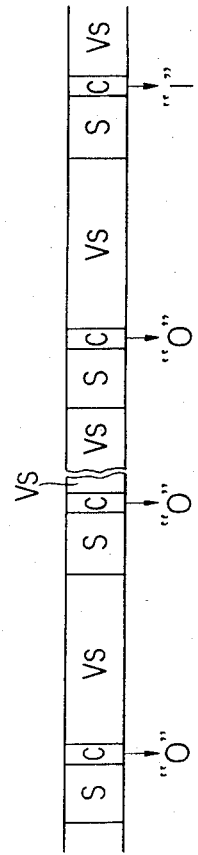
FIG. 13 is a video signal transmission frame format.

FIG. 13 shows a video frame format inserted in the video information V of FIG. 12. Reference symbol S denotes horizontal sync word pattern; C, locked/nonlocked control datum; and $V_S$, video information.

When the locked/nonlocked control datum C is set to logic level "0", locked coding is performed. However, when the locked/nonlocked control datum C is set to logic level "1", nonlocked coding is performed. This datum is effectively used when the receiving- and sending-side equipment comprises A-type equipment, respectively. Even during the coding operation, the switching between locked coding and nonlocked coding can be easily performed in accordance with the degree of frequency deviation of the video signal source.

At the receiving side, the signals supplied through a data input 65 are decoded by the decoding equipment 66. Subsequently, the decoded signals are converted to analog signals. As a result, the original video signal appears at a video signal output 67. Furthermore, the backward video signal transmission in which the video signal appears at a video signal output 74 is performed in the same manner as described above.

In the above description, the locked/nonlocked data are transmitted for each scanning line. However, this transmission can be performed in every field or frame.

Furthermore, in the above embodiment, the coding and decoding equipment 62 and 73 comprise A-type equipment, respectively. However, any type of equipment described above may be used. If B-type equipment is used, nonlocked coding is performed irrespective of the frequency deviation of the video signal. When the distant (receiving-side) equipment comprises C-type equipment, mutual communication cannot be performed. However, when the distant equipment comprises A-type equipment, mutual communication can be performed.

If the coding and decoding equipment 62 and 73 comprise C-type equipment, respectively, decoding cannot be performed when the signals such as the VTR output which has a great frequency deviation are input. And, when the distant equipment comprises B-type equipment, mutual communication cannot be performed. However, when the signals with high frequency precision are supplied, they can communicate with the A- or C-type equipment.

What is claimed is:

1. Intraframe coding equipment for video signals of different quality, comprising:

controlling means for detecting whether or not a frequency deviation of sync signals in input video signals falls within a predetermined range, for switching between a sampling clock which is locked on a video signal and a sampling clock which is nonlocked in accordance with a detection result, and switching between first and second coding algorithms;

clock generating means for generating a first clock signal which is synchronous with a frequency of the sync signal when the frequency deviation of the signal falls within the predetermined range, and for generating a second clock signal which is asynchronous with the frequency of the sync signal when the frequency deviation of the sync signal falls outside predetermined range;

sampling means for locked sampling or nonlocked sampling the input video signal in accordance with the first clock signal or the second clock signal from sad clock generating means;

coding means for coding by the first coding algorithm a signal obtained by locked sampling of the input video signal and by the second coding algorithm a signal obtained by nonlocked sampling the input video signal, one of the first and second coding algorithms being selected and operated by said controlling means;

first prohibiting means for prohibiting frequency switching between first and second clock signals when the frequency of the sync signal in the video signal is near the predetermined range;

second prohibiting means for prohibiting switching from the first clock signal to the second clock signal when the put video signal having a small frequency deviation within the predetermined range is temporarily interrupted; and switching means for detecting that a non-input state has changed to a state where the input video signal having a small frequency deviation within the predetermined range is supplied, and for switching from the second clock signal to the first clock signal.

2. Equipment according to claim 1, wherein said controlling means includes:

a sync separator for separating the sync signal from the input video signal;

a phase locked oscillator for generating a clock pulse which has a phase synchronous with a phase of the sync signal from said sync separator; and a frequency deviation detector for receiving the clock pulse from said phase locked oscillator and for detecting that the frequency deviation of the sync signal falls outside the predetermined range.

3. Equipment according to claim 2, wherein said frequency deviation detector comprises:

a measurement circuit for measuring the frequency of the sync signal included in the input video signal; and comparison circuits for comparing an upper limit of the predetermined range with a frequency which is an output signal from said measurement circuit and a lower limit of the predetermined range with a frequency which is the output signal from said measurement circuit respectively, so as to determine whether or not the frequency deviation falls within the predetermined range.

4. Equipment according to claim 2, wherein said clock generating means includes a switch for selectively supplying one of the first clock signal which is the output signal from said phase locked oscillator or a frequency-divided signal thereof, and the second clock which is the output from said line clock signal source or a frequency-divided signal thereof in accordance with the signal which is the output from said frequency deviation detector.

5. Intraframe coding equipment for video signals of different quality, comprising:

controlling means for detecting whether or not a frequency deviation of sync signals in input video signals falls within a predetermined range, for switching between a sampling clock which is locked on a video signal and a sampling clock which is nonlocked in accordance with a detection result, and switching between first and second coding algorithms;

clock generating means for generating a first clock signal which is synchronous with a frequency of the sync signal when the frequency deviation of the signal falls within the predetermined range, and for generating a second clock signal which is asynchronous with the frequency of the sync signal when the frequency deviation of the sync signal falls outside predetermined range;

sampling means for locked sampling or nonlocked sampling the input video signal in accordance with the first clock signal or the second clock signal from said clock generating means; and coding means for coding by the first coding algorithm a signal obtained by locked sampling of the input video signal and by the second coding algorithm a signal obtained by nonlocked sampling the input video signal, one of the first and second coded algorithms being selected and operated by said controlling means;

said first coding algorithm comprising a predictive coding method which uses a single picture element value or a plurality of picture element values between the present scanning line an the Nth (N=0, 1,2, ...) scanning line before the present scanning line as a predictive value, and the second coding algorithm comprising a predictive coding method which uses a single picture element value or a plurality of picture element values of the present scanning line as a predictive value.

6. Equipment according to claim 5, wherein the first and second coding algorithms are selected by selecting a value of two output values from sample memories which store the predictive values.

7. Equipment according to claim 5, wherein the input video signal comprises an NTSC color television signal, the sampling frequency is substantially 2.5 times a color subcarrier frequency, the first coding algorithm comprises a predictive coding method which uses a predictive value of a 570th previous picture element before the present picture element, and the second coding algorithm comprises a predictive coding method which uses a predictive value of a 5th previous picture element before the present picture element.

8. Intraframe coding equipment for video signals of different quality, comprising:

controlling means for detecting whether or not a frequency deviation of sync signals in input video signals falls within a predetermined range, for switching between a sampling clock which is locked on a video signal and a sampling clock which is nonlocked in accordance with a detection result, and switching between first and second coding algorithms;

clock generating means for generating a first clock signal which is synchronous with a frequency of the sync signal when the frequency deviation of the signal falls within the predetermined range, and for generating a second clock signal which is asynchronous with the frequency of the sync signal when the frequency deviation of the sync signal falls outside predetermined range;

sampling means for locked sampling or nonlocked sampling the input video signal in accordance with the first clock signal or the second clock signal from said clock generating means; and coding means for coding by the first coding algorithm a signal obtained by locked sampling of the input video signal and by the second coding algorithm a signal obtained by nonlocked sampling the input video signal, one of the first and second coding algorithms being selected and operated by said controlling means;

said coding means includes means for determining a first predictive value of a single picture element value or a plurality of picture element values between a present scanning line and an Nth (N=0, 1, 2 ...) scanning line before a present scanning line from a value corresponding to the present picture element value in accordance with the first coding algorithm or determines a second predictive value of a single picture element value or a plurality of picture element values of a single scanning line from the value corresponding to the present picture element in accordance with the second coding algorithm, so as to obtain a first order predictive error signal, subtracts the first order predictive error signal from that of previous picture element, so as to obtain a second order predictive error signal, and quantizes the second order predictive error signal, thereby directly intraframe-coding an NTSC signal.

9. Equipment according to claim 8, in combination with decoding equipment comprising means for obtaining the first order predictive error signal by decoding the second order predictive error signal received thereby and reproducing means for reproducing the NTSC signal by decoding the first order predictive error signal.

10. A communication network for digital video signals, which includes: first type intraframe coding and decoding equipment available for either a locked sampling coupled with its prediction algorithm and a nonlocked sampling coupled with its prediction algorithm; second type intraframe coding and decoding equipment available for only nonlocked sampling coupled with its prediction algorithm; and third type intraframe coding and decoding equipment available for only the locked sampling coupled with its prediction algorithm, wherein receiving-side equipment transmits data which indicates one of the first, second and third types of the receiving-side equipment to sending-side equipment, and wherein the sending-side equipment receives the data, determines whether the receiving-side equipment can be connected to the sending-side equipment, and uses one of the locked and nonlocked coding algorithms which allows matching with the receiving-side equipment.

11. The first type intraframe coding and decoding equipment used in the communication network claimed in claim 10, including:
first means for detecting whether a frequency deviation of a sync signal included in the input video signal falls outside a predetermined range;
second means for receiving the data which indicates the type of the receiving-side equipment and for determining the type of the receiving-side equipment; and
switch controlling means for switching between locked sampling clock pulse and nonlocked sampling clock pulse and between the locked and nonlocked coding algorithms in accordance with a detection result from said first means when the receiving-side equipment is of the first type, for selecting the nonlocked coding algorithm when the receiving-side equipment is of the second type, and for selecting the locked coding algorithm when the receiving-side equipment is of the third type.

* * * * *